US006626030B2

(12) United States Patent
Shimizu

(10) Patent No.: US 6,626,030 B2
(45) Date of Patent: Sep. 30, 2003

(54) CYLINDER DISCRIMINATION DEVICE AND CYLINDER DISCRIMINATION METHOD OF ENGINE

(75) Inventor: Hirokazu Shimizu, Atsugi (JP)

(73) Assignee: Unisia Jecs Corporation, Kanagawa-Ken (JP)

( * ) Notice: Subject to any disclaimer, the term of this patent is extended or adjusted under 35 U.S.C. 154(b) by 312 days.

(21) Appl. No.: 09/865,730

(22) Filed: May 29, 2001

(65) Prior Publication Data

US 2002/0007244 A1 Jan. 17, 2002

(30) Foreign Application Priority Data

Jun. 2, 2000 (JP) ....................................... 2000-165669

(51) Int. Cl.[7] ......................... G01M 15/00; G06F 19/00
(52) U.S. Cl. ....................................... 73/117.3; 701/114
(58) Field of Search ................................ 73/116, 117.3, 73/118.1; 701/113, 114

(56) References Cited

U.S. PATENT DOCUMENTS 5,604,304 A * 2/1997 Kokubo et al. ............ 73/117.3
5,808,186 A * 9/1998 Matsumoto et al. ....... 73/117.3
5,937,822 A * 8/1999 Nakajima ................... 123/295
5,979,413 A * 11/1999 Ohnuma et al. .............. 73/116

* cited by examiner

*Primary Examiner*—Edward Lefkowitz
*Assistant Examiner*—Maurice Stevens
(74) *Attorney, Agent, or Firm*—Sughrue Mion, PLLC

(57) ABSTRACT

In a cylinder discrimination device in an engine, a crank angle signal is output for each unit crank angle in synchronization with the rotation of a crankshaft in the engine, different numbers of cylinder discrimination signals are output corresponding to cylinders to be discriminated during a predetermined crank angle period, and a count value of the crank angle signals to be output after a cranking start is held each time the cylinder discrimination signal is output. By comparing the count value of the number of the crank angle signal outputs at a first cylinder discrimination timing with the past count values, to detect the number of the cylinder discrimination signals output during the predetermined crank angle period, and first cylinder discrimination after the cranking start is performed based on the number of the detected cylinder discrimination signals.

14 Claims, 15 Drawing Sheets

| CAMCNT1 VALUE | 0 | 2 | 0 | 1 | 2 | 2 | EXCEPT LEFT |
|---|---|---|---|---|---|---|---|
| CAMCNT2 VALUE | 1 | 2 | 2 | 0 | 1 | 0 | |
| CYLCS VALUE | 3 | 4 | 5 | 6 | 1 | 2 | 0 |
| CURRENT CYLINDER | #2 | #3 | #4 | #5 | #6 | #1 | - |

CYLINDER DISCRIMINATION DEVICE AND CYLINDER DISCRIMINATION METHOD OF ENGINE

FIELD OF THE INVENTION

The present invention relates to a technique for discriminating cylinders at a predetermined stroke of an engine, and particularly relates to a technique for discriminating cylinders as soon as possible after start of cranking.

DESCRIPTION OF THE RELATED ART

As the conventional cylinder discrimination device, there is known such a device in which cylinder discrimination signals of the number corresponding to the number of cylinders are output from a cam sensor during an output of a reference crank angle signal from a crank angle sensor, to perform cylinder discrimination (Japanese Unexamined Patent Publication No. 5-106500).

However, in an engine equipped with a valve timing control device for detecting a rotation phase of a camshaft relative to a crankshaft to perform successively a variable control of the rotation phase, there is a need to detect a crank angle position for each unit crank angle to a reference crank angle position only by a crank angle signal output in synchronization with rotation of the crankshaft. Therefore, to generate and detect the reference crank angle signal in another line separately from the unit crank angle signal requires the cost and space, since two crank angle sensors are substantially disposed and two a signal processing systems are needed. When the reference crank angle signal is mixed with a signal for each unit crank angle, the detection of the reference crank angle becomes difficult. There is a system to detect the reference crank angle position based on a cycle ratio between prior and post signals as a structure to ignore the unit crank angle signal at a position corresponding to the reference crank angle position.

However, in such a system to detect the reference crank angle position with the cycle ratio and the like, when the engine rotation immediately after a cranking start is in an unstable state, it is difficult to accurately detect the reference crank angle position, and the detection becomes possible at a second reference crank angle position. Consequently, cylinder discrimination becomes possible based on the number of cylinder discrimination signals between a first cylinder discrimination timing and the next cylinder discrimination timing detected by the detection of the reference crank angle position. Namely, at the second cylinder discrimination timing to be detected after the cranking start (=the third cylinder discrimination timing if the first cylinder discrimination timing impossible to be detected is included), the cylinder discrimination is possible for the first time.

When the cylinder discrimination is delayed as above, a fuel is wastefully injected without combustion, resulted in deterioration of an engine start performance and an exhaust emission.

SUMMARY OF THE INVENTION

The present invention has been achieved taking into consideration the above mentioned problems and has an object to enable cylinder discrimination to be performed as soon as possible after a cranking start.

Especially, for an engine equipped with a valve timing control device for successively performing a variable control of valve timings of an intake valve and an exhaust valve by successively performing a variable control of rotation phase of a camshaft relative to a crankshaft, cylinder discrimination can be performed as soon as possible after a cranking start.

To achieve the above object, the present invention is constituted as follows.

A crank angle signal is output, at a crank angle position for each unit crank angle using a reference crank angle position for each stroke phase difference between cylinders as a reference, from a sensor mounted to a member interlocked with a crankshaft in synchronization with the rotation of the crankshaft.

From a sensor mounted to a member interlocked with a camshaft, different numbers of cylinder discrimination signals are output, depending on cylinders to be discriminated, during a predetermined crank angle period for each stroke phase difference between cylinders.

A counter or a memory counts the number of crank angle signals output after a cranking start and holds a count value of each time the cylinder discrimination signal is output.

A computation processing unit (CPU) compares the count value of the number of crank angle signal outputs at a first cylinder discrimination timing with the past count value held, and detects the number of cylinder discrimination signals output during the predetermined crank angle period, to perform first cylinder discrimination after the cranking start based on the number of the cylinder discrimination signals.

In this way, each time the cylinder discrimination signal after the cranking start is output, the count value of the number of the crank angle signal outputs is held. Among these held count values, the count value which has a difference within a certain value to the count value in the cylinder discrimination timing can be judged to have been obtained because the cylinder discrimination signal is output during the predetermined crank angle period. As a result, the number of cylinder discrimination signals output during the predetermined crank angle period is detected so that cylinder discrimination can be performed.

Accordingly, even if the first cylinder discrimination timing cannot be detected at that point after the cranking start, at a second cylinder discrimination timing the cylinder discrimination can be accurately performed, thereby enabling to improve the engine start performance and the exhaust emission performance by quick cylinder discrimination.

Further, the constitution may be such that, as the past count values, a plurality of count values including the latest renewed value and the values prior to the latest renewed value are held, and based on a value obtained by subtracting each past count value from the count value at the first cylinder discrimination timing, the number of the cylinder discrimination signals output during the predetermined crank angle period is detected.

According to the above constitution, only by holding the number of count values of the crank angle signals required for the cylinder discrimination, the cylinder discrimination can be performed by detecting the number of cylinder discrimination signals output during the predetermined crank angle period, based on the value obtained by subtracting each past count value from the count value at the first cylinder discrimination timing.

It is preferable that a detection of the reference crank angle position may be prohibited until a predetermined number of the crank angle signals after the cranking start is output.

In a case of a first reference crank angle position after the cranking start, even if the first cylinder discrimination timing is detected based on the detection of the reference crank angle position, since the predetermined crank angle period capable of the cylinder discrimination has not elapsed, the cylinder discrimination can not be performed. Further, since the engine rotation is unstable immediately after the cranking start, there is a possibility of erroneous detection of the reference crank angle position.

Therefore, until the predetermined number of crank angle signals after the cranking start is output, the detection of the reference crank angle position is prohibited, so that an erroneous detection of the reference crank angle position can be prevented and the cylinder discrimination can be accurately performed at the first cylinder discrimination timing based on the detection of the first reference crank angle position.

Preferably, if the count value of the crank angle signals when detected a cylinder discrimination timing after the cranking start does not reach the count value of when the predetermined crank angle period has elapsed, the cylinder discrimination at the cylinder discrimination timing is prohibited.

If, after a cranking start, the detection of the reference crank angle position is not prohibited for the time being, and the count value of crank angle signals when detected the cylinder discrimination timing based on the detected reference crank angle position does not reach the count value of when the predetermined crank angle period has elapsed, there is a possibility that the cylinder discrimination cannot be performed normally and the reference crank position is detected erroneously. Therefore, at that stage, the cylinder discrimination is prohibited.

The other objects and features of the present invention will become understood from the following description with the accompanying drawings.

DETAILED DESCRIPTION OF THE PREFERRED EMBODIMENT

Embodiments of the present invention will now be explained with reference to the drawings.

Figure 1:
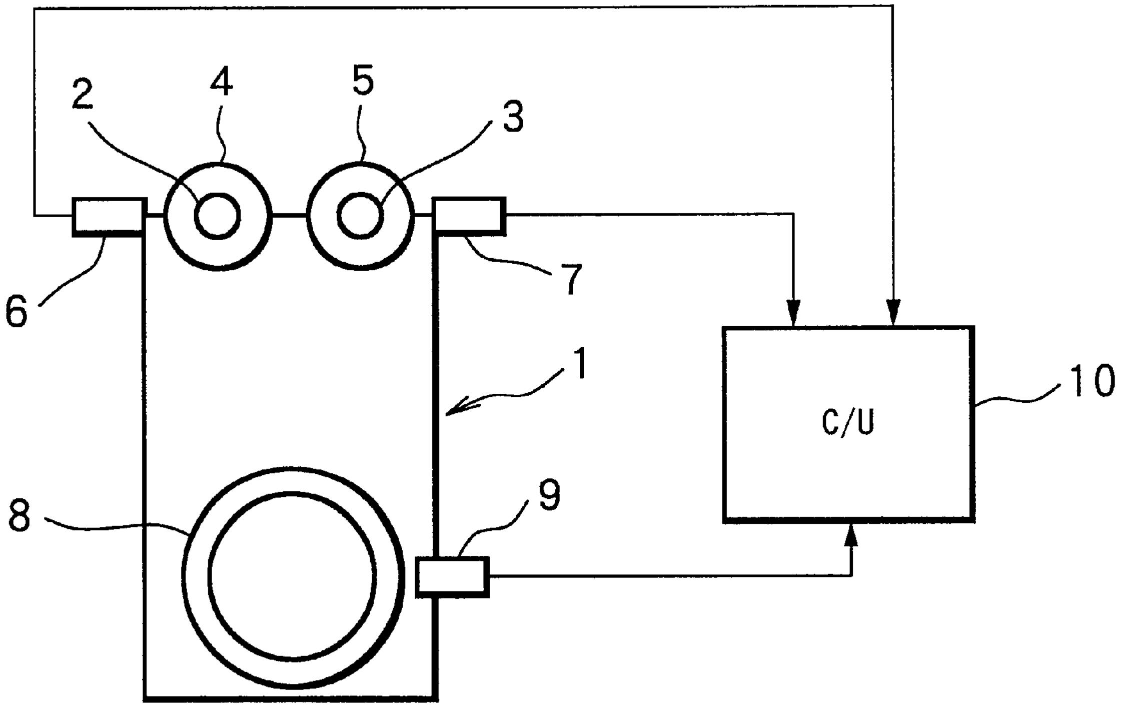
FIG. 1 is a diagram showing a system structure of an in-line four cylinder engine according to a first embodiment of the present invention.

In FIG. 1 showing a system structure according to a first embodiment, an in-line four cylinder engine 1 is equipped with an intake side camshaft 2 and an exhaust side camshaft 3.

Signal plates 4, 5 are axially supported, respectively, on each axis of the intake side camshaft 2 and the exhaust side camshaft 3. There are provided magnetic cam sensors 6, 7 for detecting projections (not shown) formed at the signal plates 4, 5, respectively, to output cylinder discrimination signals Phase, respectively.

A magnetic crank angle sensor 9 is provided for detecting projections (not shown) formed at a signal plate 8 mounted to a crank pulley, to output a position signal POS for each unit angle (10°).

A control unit 10 receives detection signals from the cam sensors 6, 7 and the crank angle sensor 9. Based on these detection signals, the control unit 10 performs cylinder discrimination to control fuel injection and/or an ignition in the engine. Further, there is provided a valve timing device (hereinafter, to be referred as VTC) for changing a valve timing while keeping an operation angle to be constant, by changing a rotation phase of the camshaft relative to a crankshaft so as to detect the rotation phase based on the detection signals, thereby feedback controlling the rotation phase.

Cylinder discrimination used for the various controls according to the first embodiment will be explained with reference to FIG. 2 to FIG. 7.

Figure 2:
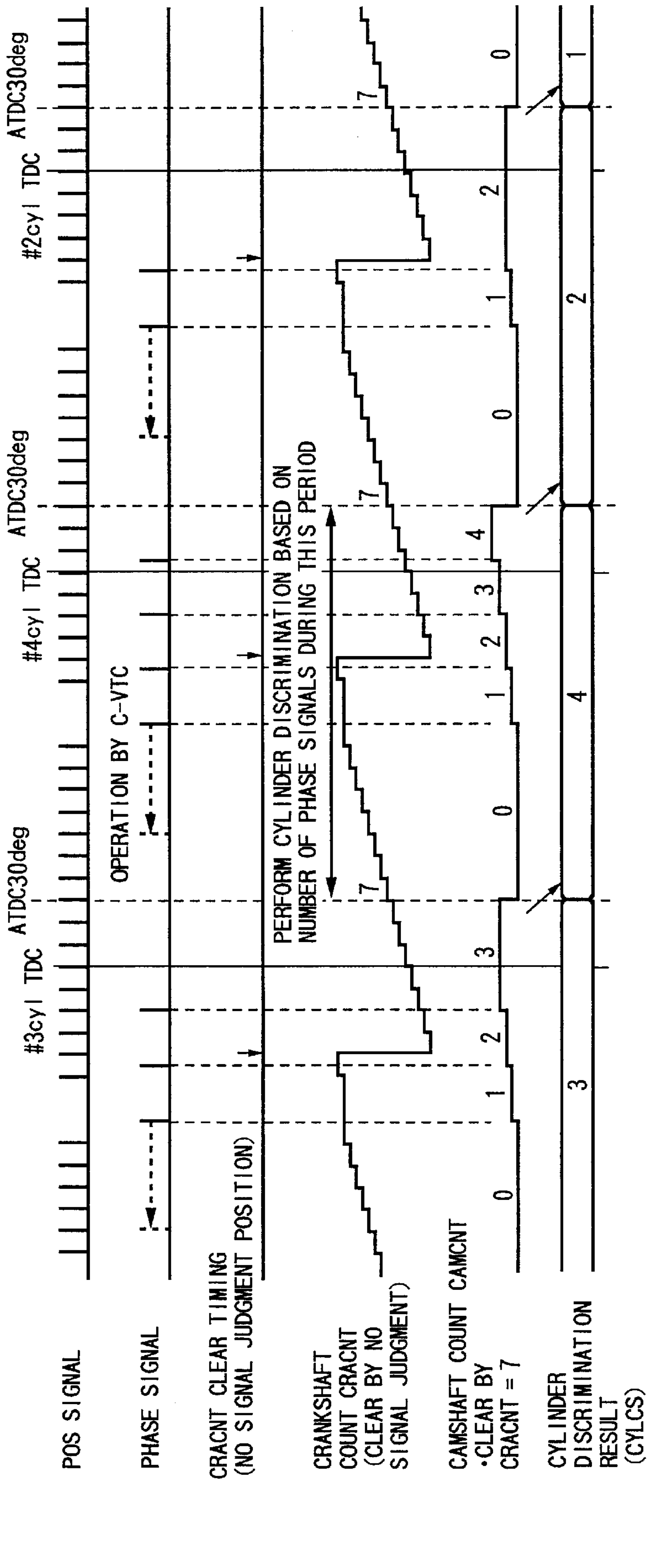
FIG. 2 is a time chart showing output characteristics of a crank angle sensor and a cam sensor, and cylinder discrimination in a normal state based on the output characteristics in the first embodiment.

In FIG. 2, a position signal POS to be output from the crank angle sensor 9 is output at each predetermined unit crank angle (10° in this embodiment), and at each 180° degree equivalent to a stroke phase difference between cylinders, there is no signal for the position signal. Then, a reference crank angle position is detected by detecting a position of no signal, and a crank angle position for each unit crank angle is detected by measuring the number of position signals POS output from the reference crank angle position with a counter CRACNT.

On the other hand, cylinder discrimination signals Phase to be output from the cam sensors 6, 7 are output at each predetermined crank angle (30° in this embodiment) by the number equal to the cylinder number for each cylinder.

Figure 5:
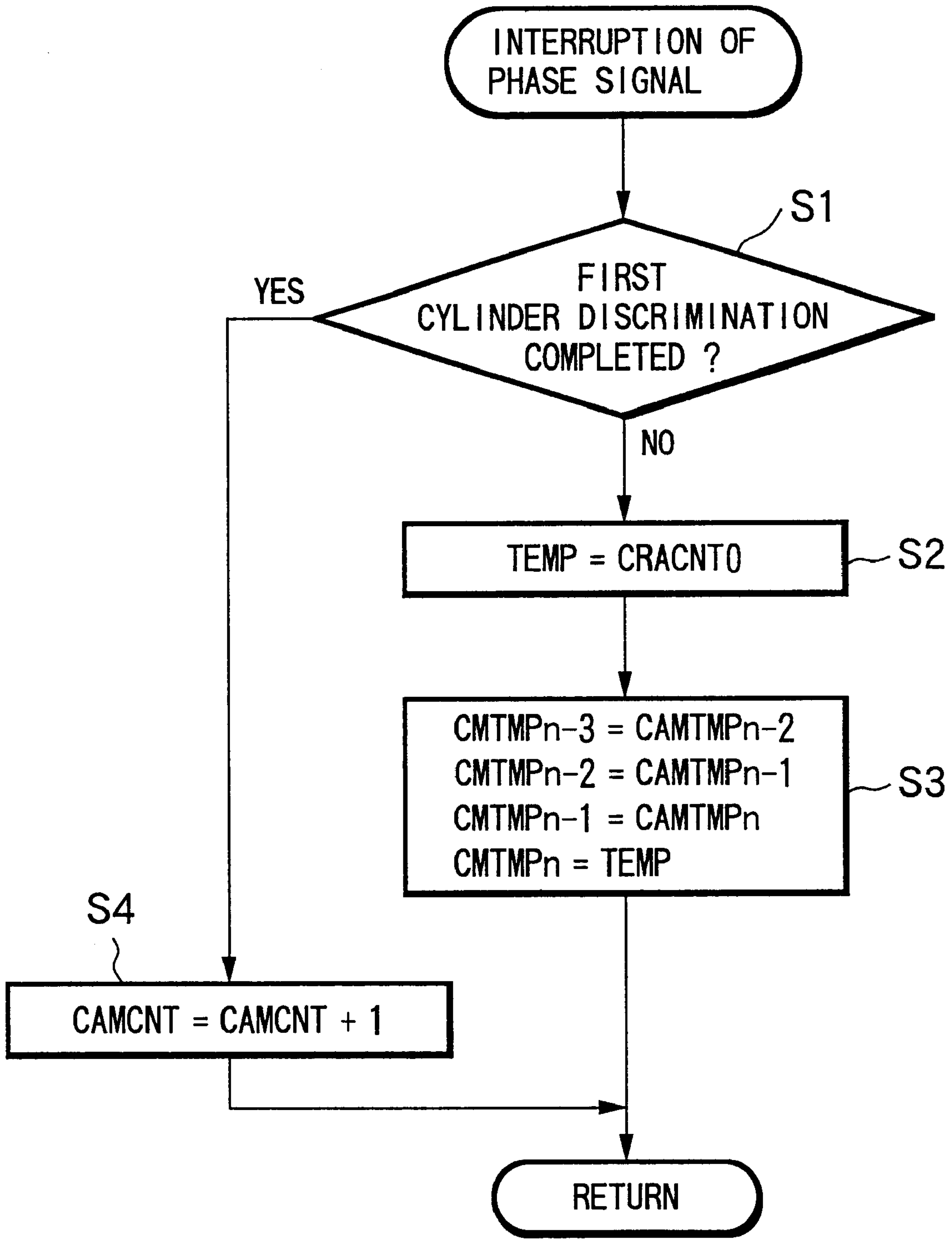
FIG. 5 is a flowchart showing an interruption processing routine based on an output of cylinder discrimination signal Phase according to the first embodiment.
Figure 6:
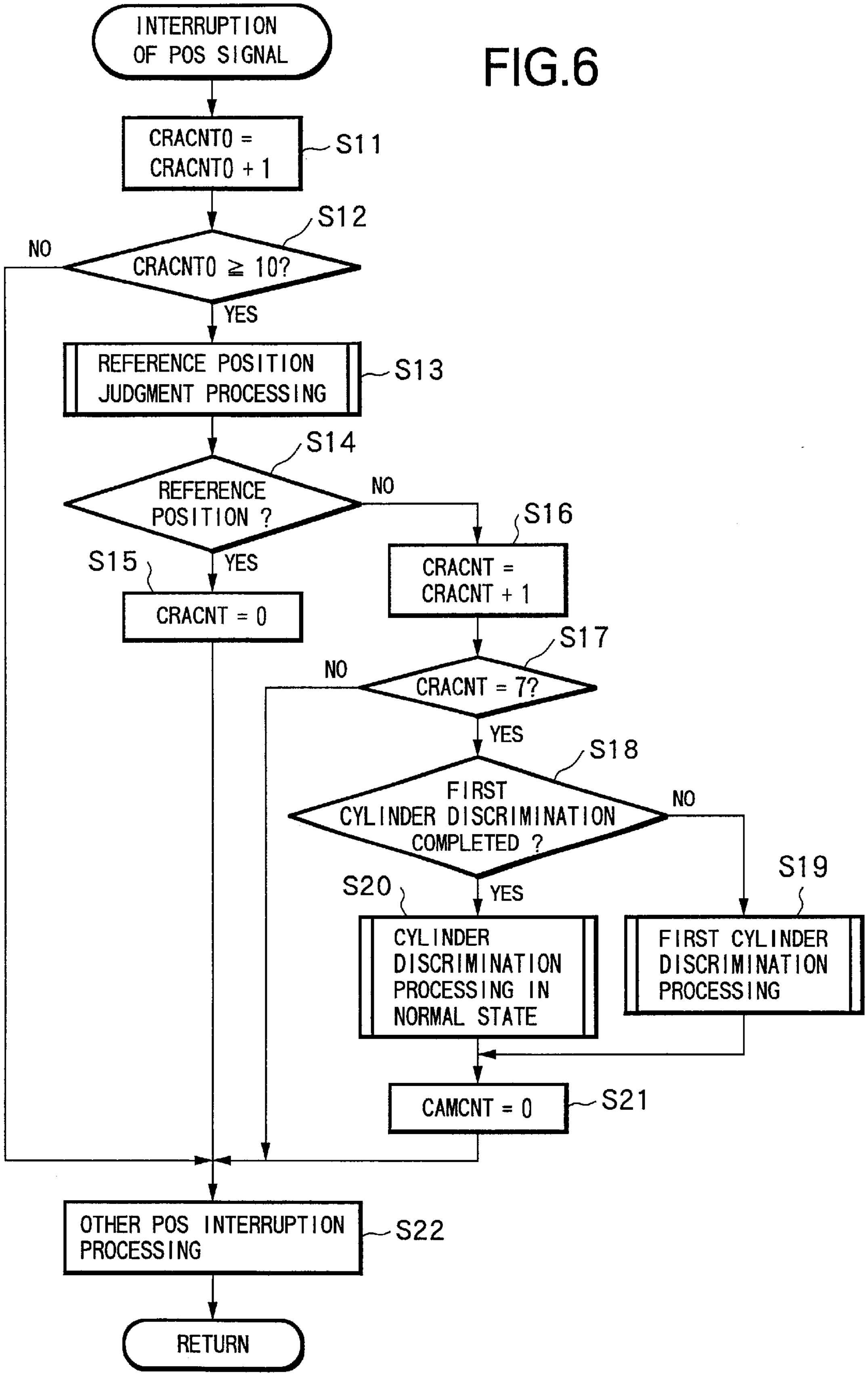
FIG. 6 is a flowchart showing an interruption processing routine based on an output of crank angle signal POS according to the first embodiment.

Normally, the number of cylinder discrimination signals Phase at each crank angle period 180° (ATCD 30° for each cylinder in this embodiment) equivalent to a cylinder stroke phase difference to be detected by the crank angle sensor 9 is directly counted (Step 4 in FIG. 5) to discriminate a cylinder corresponding to the counted number (Step 20 in FIG. 6). To be specific, in a case that an ignition order is #1-#3-#4-#2, when the counted number of the cylinder discrimination signals Phase by the counter CAMCNT is 1, the next ignition cylinder is discriminated to be #3. Similarly, when the counted number CAMCNT is 3, the next ignition cylinder is discriminated to be #4, when the counted number CAMCNT is 4, the next ignition cylinder is discriminated to be #2 and when the counted number CAMCNT is 2, the next ignition cylinder is discriminated to be #1.

Figure 3:
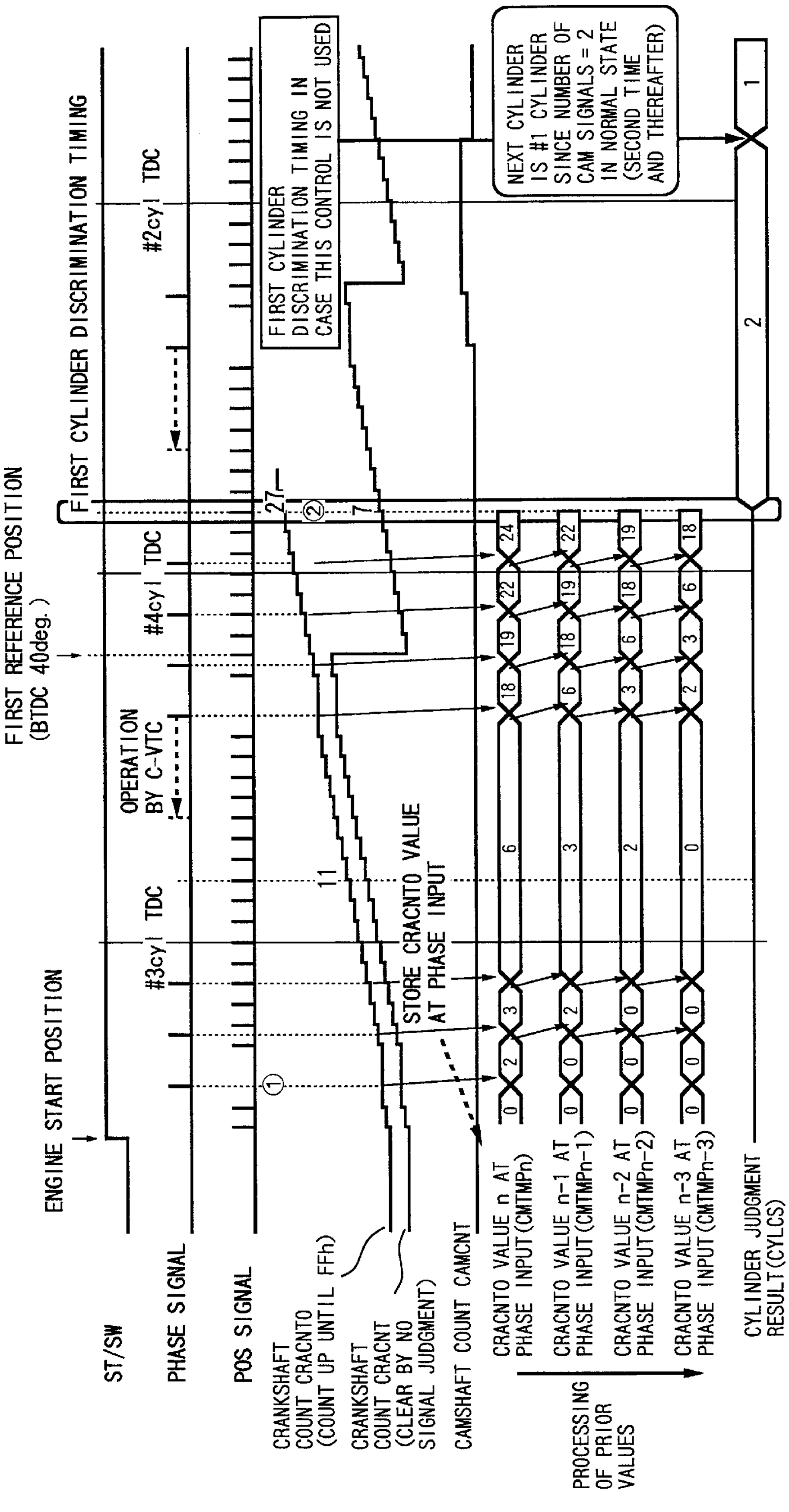
FIG. 3 is a time chart showing first cylinder discrimination after a cranking start in the first embodiment.

On the other hand, first cylinder discrimination after a cranking start according to the present invention is performed as follows (refer to FIG. 3).

A main counter CRACNT0 counts the number of position signals POS (crank angle signal) to be output after the cranking start (Step 11 in FIG. 6).

Each time the cylinder discrimination signal Phase is output, a first sub-counter CMTMPn renews a value thereof to a count value of the main counter CRACNT0 at that time, to hold (Steps 2, 3 in FIG. 5).

Each time the cylinder discrimination signal Phase is output, second to four sub-counters CMTMP(n−1) to CMTMP(n−3) renew count values thereof to the counted values which have been held in the respective prior sub-counters CMTMPn to CMTMP(n−2) (Step 3 in FIG. 5,) to hold.

At the first cylinder discrimination timing after the cranking start (Steps 17→18→19 in FIG. 6), the cylinder discrimination is performed based on a value obtained by subtracting the count value of each sub-counter CMTMPn~CMTMP (n−3) from the count value of the main counter CRACNT0.

As explained with reference to a concrete example shown in FIG. 3, after a count value of the main counter CRACNT0 reaches 2 after the cranking start, a first cylinder discrimination signal Phase is output, so that the count value 2 of the main counter CRACNT0 is held to the first sub-counter CMTMPn, and in turn each time second, third cylinder discrimination signal is output, the count value is renewed to the count value 3, 6 of the main counter CRACNT0 at that time, to be held. Then, when the first cylinder discrimination signal Phase for the next cylinder discrimination is output, the first sub-counter CMTMPn which has been holding the count value 6 is renewed the counter value thereof to the count value 18 of the main counter CRACNT0, to hold, and in turn each time the second to four cylinder discrimination signals Phase is output, the count value is renewed to the count values 19, 22, and 24, to be held.

Further, when the first cylinder discrimination signal Phase is output, the second sub-counter CMTMP(n−1) holds the count value 0 of the prior first sub-counter CMTMPn, and each time the second, third cylinder discrimination signals Phase is output, the second sub-counter CMTMP(n−1) renews the count value thereof to the count values 2, 3 of the first sub-counter CMTMPn, to hold, and renews the count value thereof to the count values 6, 18, 19, and 22 each time four cylinder discrimination signals for the next cylinder discrimination is output.

Similarly, only when a third cylinder discrimination signal Phase after the cranking start is output, the third sub-counter CMTMP(n−2) renews the count value thereof from 0 to the count value 2 of the prior second sub-counter CMTMP(n−1), and each time four cylinder discrimination signals Phase for the next cylinder discrimination is output, the third sub-counter CMTMP(n−2), in turn, renews the count value thereof to the count values 3, 6, 18, and 19, to hold. Only when the cylinder discrimination signal Phase for second cylinder discrimination after the cranking start is output, the fourth sub-counter CMTMP(n−3) renews the count value thereof from 0 to the count value 2 of the prior third sub-counter CMTMP(n−2), to hold, and in turn renews to the count values 3, 6, and 18.

Then, the first cylinder discrimination is performed at a second cylinder discrimination timing after the cranking start (detect the second cylinder discrimination timing as the first discrimination timing). Namely, the cylinder discrimination according to the present invention is performed based on the number of cylinder discrimination signals Phase between two cylinder discrimination timings. However, when cranking is started immediately after a reference crank angle position, it is impossible to detect the first cylinder discrimination timing based on the reference crank angle position detection. Moreover, in a case of the reference crank angle position immediately after the cranking start, since an engine rotation is unstable and it is difficult to accurately detect the reference crank angle position based on a cycle ratio, the detection of the reference crank angle position is prohibited. Accordingly, the first cylinder discrimination timing is not detected based on the reference crank angle position. However, in a case a cylinder discrimination method in a normal state (second time and thereafter) is adopted in the first cylinder discrimination, when one more cylinder discrimination timing is detected (a third cylinder discrimination timing including the cylinder discrimination timing which is impossible to be detected after the cranking start), the cylinder discrimination becomes possible. Contrary to this, according to the invention, when the second cylinder discrimination timing is detected as the first cylinder discrimination timing, the cylinder discrimination becomes possible.

Here, according to the embodiment, an inaccurate detection of the reference crank angle position at the unstable engine rotation is prohibited, and also a mask processing to prohibit the detection of the reference crank angle position during a predetermined period after the cranking start is performed so that the cylinder discrimination can be accurately performed when the first cylinder discrimination timing is detected based on the first reference crank angle position detection.

Figure 4:
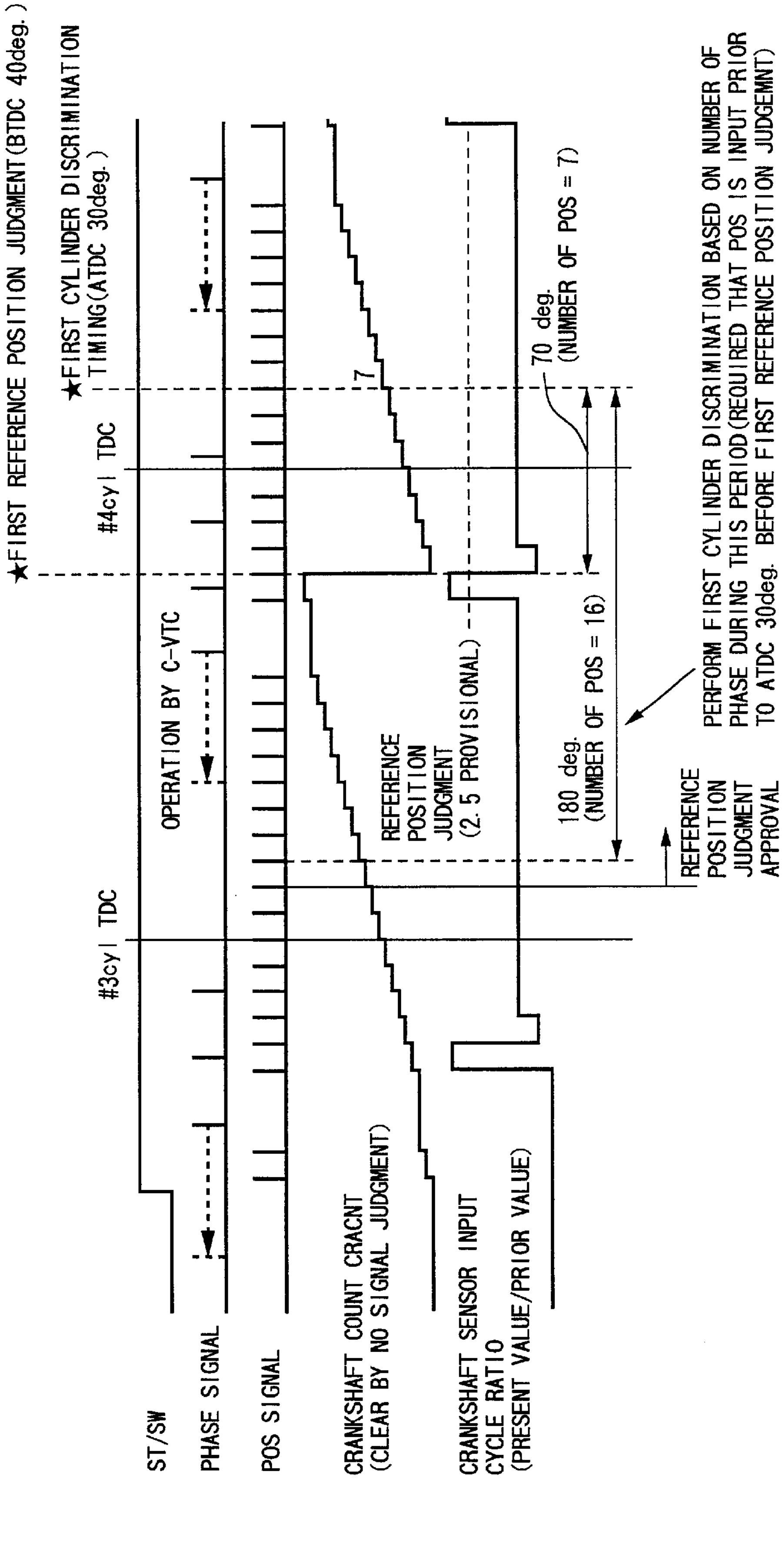
FIG. 4 is a time chart showing a mask processing at the first cylinder discrimination according to the first embodiment.

FIG. 4 shows the mask processing. When a concrete cylinder discrimination timing is set to 30° after a top dead center (ATDC), in order to enable the cylinder discrimination when the first discrimination timing is detected, it is required that a crank angle period equivalent to a cylinder stroke phase difference (180° according to four cylinder engine in this embodiment) has elapsed prior to the first discrimination timing. If the reference crank angle position (a first position after a period of no crank angle signal) is set to 40° before the top dead center (BTDC), since the number of position signals POS output during a period from the first reference crank angle position detection to the first cylinder discrimination timing detection is 7, and the number of the position signals POS output during the crank angle period (180°) equivalent to the cylinder stroke phase difference is 16, the number (number of masks) of the position signals POS output to prohibit the detection of the reference crank angle position after the cranking start is determined in accordance with the following equation, setting a tolerance as 1.

Number of masks=16−7+1=10.

Namely, the detection of the reference crank angle position based on a cycle ratio of the position signals POS is prohibited until the count value of the position signals POS by the main counter CRACNT0 after the cranking start reaches 10 (judgment at Step 12 in FIG. 6 is No). The detection of the reference crank angle position is started after the count value becomes 10 or more (judgment at Step 12 is YES), and when a predetermined number (7) of the output position signals POS is detected after the detection of the first reference crank angle position, the first discrimination timing is detected (Steps 13, 14→16, 17→18, in FIG. 6).

Next, the first cylinder discrimination at the first cylinder discrimination timing detected in such a manner will be explained (refer to FIG. 3 and FIG. 7).

The count values of the first to fourth sub-counters CMTMPn-CMTMP(n−1) are subtracted, respectively, from the count value of the main counter CRACNT0 at the time of when the first cylinder discrimination timing is detected, and it is judged whether or not each of these four subtracted values is equal to a predetermined value 16 or less. The predetermined value 16 is the number of the position signals POS output during the crank angle period in which the cylinder discrimination is possible based on the number of the cylinder discrimination signals output during the crank angle period equivalent to the cylinder stroke phase difference. Accordingly, when the subtracted value is the predetermined value 16 or less, the count value of the corresponding sub-counter CMTMP is renewed by the output of the cylinder discrimination signal Phase during the predetermined crank angle period.

Figure 7:
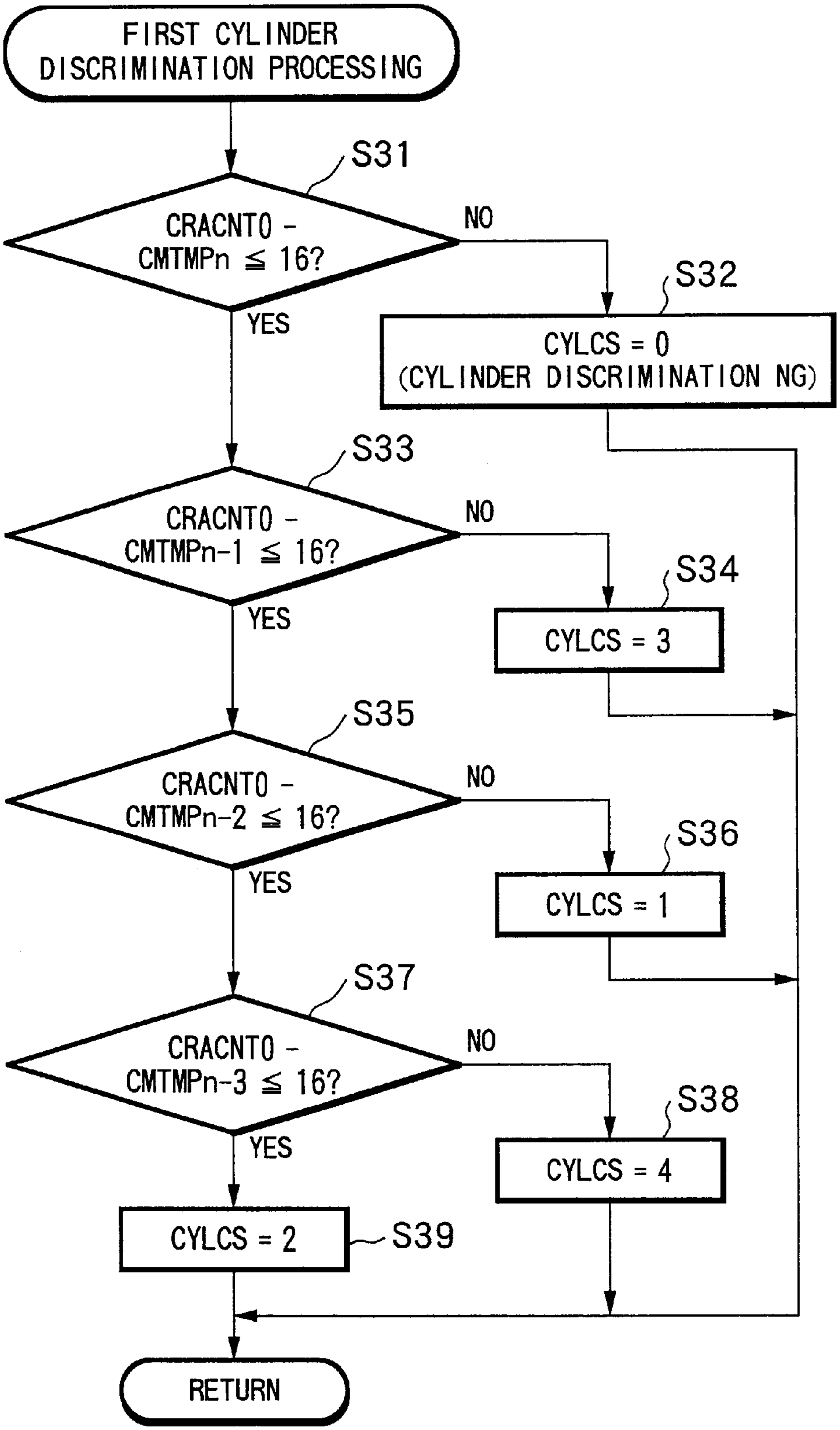
FIG. 7 is a flowchart showing a first cylinder discrimination processing routine according to the first embodiment.

Using the above, in a case each of the four subtracted values of the first to fourth sub-counters CMTMPn-CMTMP (n−3) from the main counter CRACNT0 is 16 or less (judgments of Steps 31, 33, 35, 37 in FIG. 7 are all YES), since the four cylinder discrimination signals Phase are output during the predetermined crank angle period, the cylinder (at a combustion stroke immediately after the cranking start) is discriminated to be #2 cylinder (Step 39 in FIG. 7). Similarly in the following, in a case each of the three subtracted values of the first to third sub-counters CMTMPn-CMTMP(n−2) from the main counter CRACNT0 is 16 or less, #4 cylinder is discriminated since three cylinder discrimination signals are output (Step 38 in FIG. 7). In a case each of the two subtracted values of the first and second sub-counters CMTMPn and CMTMP(n−1) from the main counter CRACNT0 is 16 or less, #1 cylinder is discriminated since two cylinder discrimination signals Phase are output (Step 36 in FIG. 7). In a case only one subtracted value of the first sub-counter CMTMPn from the main counter CRACNT0 is 16 or less, #3 cylinder is discriminated since one cylinder discrimination signal is output (Step 34 in FIG. 7). When each of the four subtracted values is over 16 (the subtracted value of the first sub-counter CMTMPn from the main counter CRACNT0 is over 16), no output of the cylinder discrimination signal is detected during the predetermined crank angle period, and the cylinder discrimination is prohibited because of abnormality (Step 32 in FIG. 7).

Next, a second embodiment in which the present invention is applied to a V-type six cylinder engine will be explained.

Figure 8:
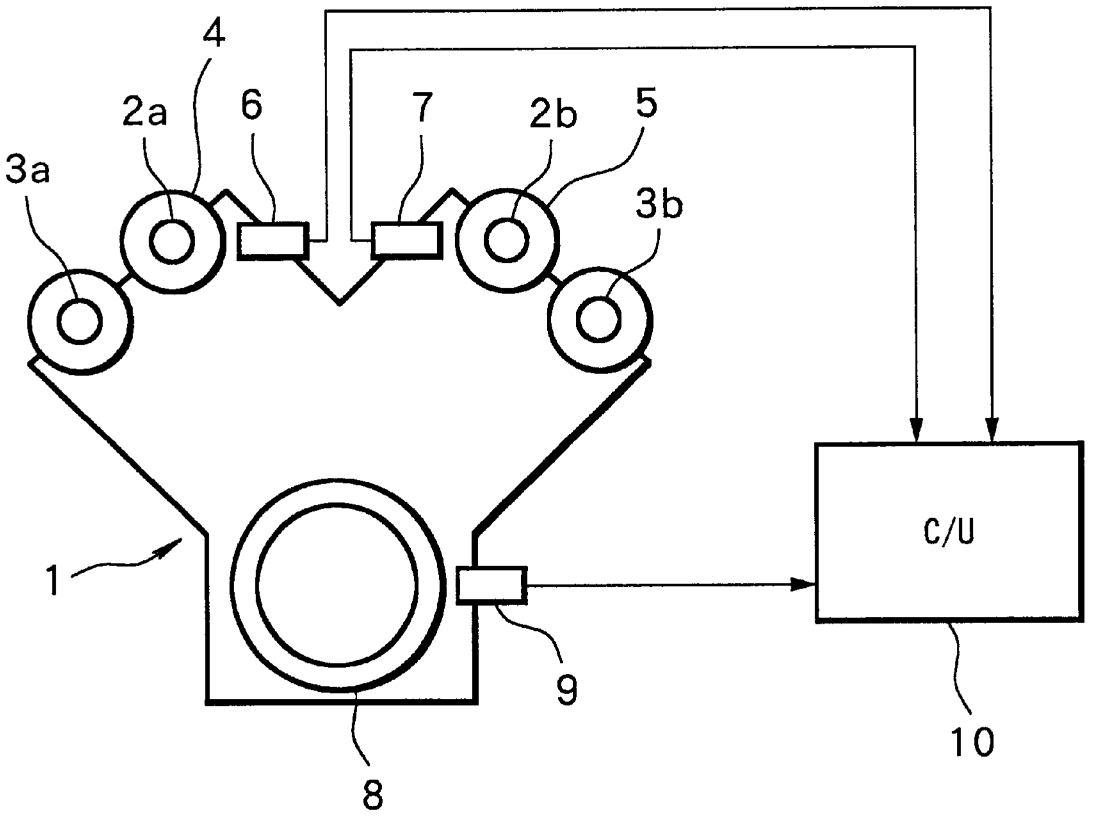
FIG. 8 is a diagram showing a system structure of a V-type six cylinder engine according to a second embodiment of the present invention.

In FIG. 8, a V-type six cylinder engine 1 has an intake side camshaft 2*a* and an exhaust side camshaft 3*a* on one bank and on the other bank an intake side camshaft 2*b* and an exhaust side camshaft 3*b*.

And, signal plates 4, 5 are axially supported, respectively, on each axis of the intake side camshaft 2*a* and the exhaust side camshaft 2*a* on the left and right banks. There are provided magnetic type left side cam sensor 6 and right side cam sensor 7 for detecting projections (not shown) formed at the signal plates 4, 5, respectively, to output cylinder discrimination signals PhaseLH and PhaseRH, respectively.

The left side cam sensor 6 and the right side cam sensor 7 may be disposed on the exhaust side camshafts 3*a* and 3*b* on the left and right banks, respectively. Further, the left side cam sensor 6 and the right side cam sensor 7 may be disposed on the intake side camshaft 2*a* and the exhaust side camshaft 3*a* on one bank.

Furthermore, a crank pulley, in the same as the first embodiment, is provided with a magnet crank angle sensor 9 for detecting projections (not shown) formed at a signal plate 8, to output a position signal POS for each unit angle (10°).

There are provided an intake valve timing control device and an exhaust valve timing control device for changing valve timings while keeping an operation angle to be constant, by changing rotation phases of the intake and exhaust side camshafts relative to a crankshaft.

Further, a control unit 10 performs an engine control while performing cylinder discrimination based on detection signals from the above described sensors, and detects rotation phases of the intake side camshafts based on the detection signals to feedback control the rotation phases. The rotation phases of the exhaust side camshafts are detected based on detection signals by other sensors (not shown in the figure).

The cylinder discrimination to be used for various controls in the second embodiment will be explained based on FIG. 9 to FIG. 15.

Figure 9:
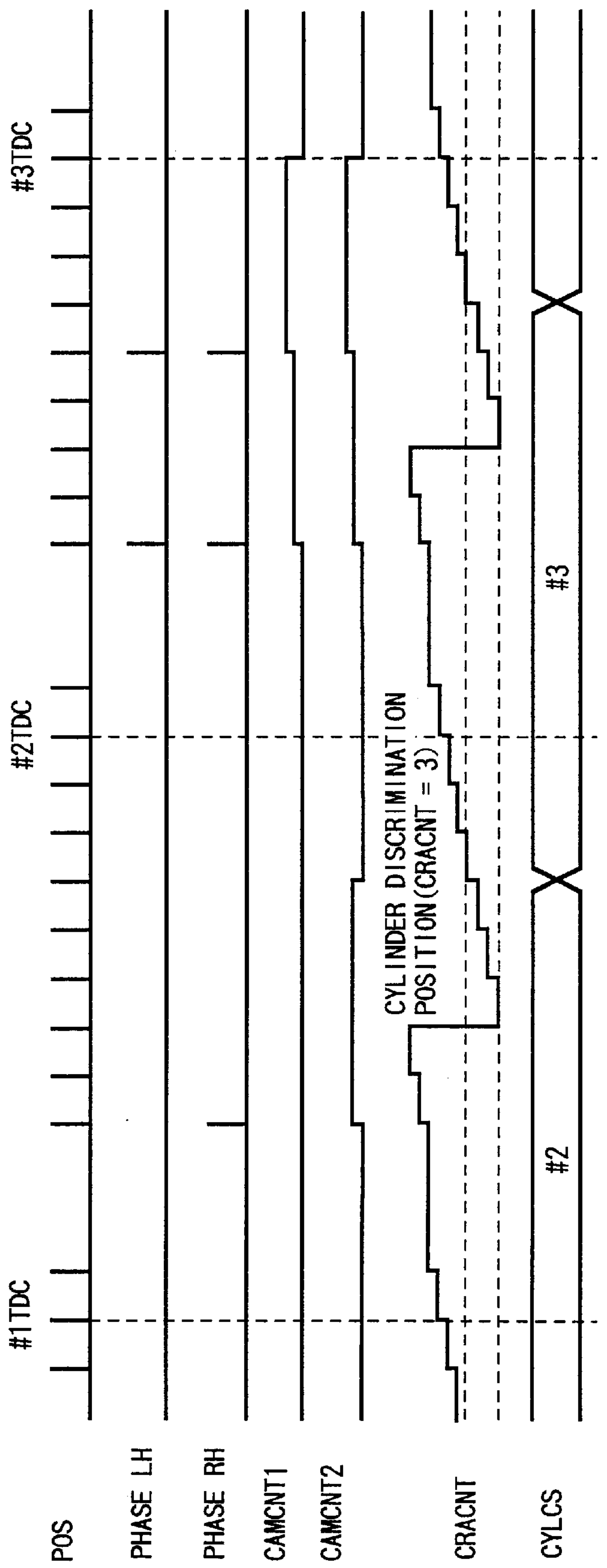
FIG. 9 is a time chart showing output characteristics of a left side cam sensor, a right side cam sensor, and a crank angle sensor, and cylinder discrimination in a normal state based on the output characteristics in the second embodiment.

In FIG. 9, there exists no signal position in the position signal POS to be output from the crank angle sensor 9 for each 120° equivalent to a stroke phase difference between cylinders and a reference crank angle position is detected by detecting the no signal position.

On the other hand, a cylinder discrimination timing is set to be BTDC 30°, and the cylinder discrimination is performed by the combination of the number of cylinder discrimination signals PhaseLH and the number of cylinder discrimination signals RH output between the cylinder discrimination timings. Specifically, when a count value of the cylinder discrimination signal PhaseLH counted by a counter CAMCNT1 is 0, and a count value of the cylinder discrimination signal PhaseRH counted by a counter CAMCNT2 is 1, #2 cylinder is discriminated. In the same way, when the count value of the cylinder discrimination signal PhaseLH is 2, and the count value of the cylinder discrimination signal PhaseRH is 2, #3 cylinder is discriminated. When the count value of the cylinder discrimination signal PhaseLH is 0, and the count value of the cylinder discrimination signal PhaseRH is 2, #4 cylinder is discriminated. When the count value of the cylinder discrimination signal PhaseLH is 1, and the count value of the cylinder discrimination signal PhaseRH is 0, #5 cylinder is discriminated. When the count value of the cylinder discrimination signal PhaseLH is 2, and the count value of the cylinder discrimination signal PhaseRH is 1, #6 cylinder is discriminated. When the count value of the cylinder discrimination signal PhaseLH is 2, and the count value of the cylinder discrimination signal PhaseRH is 0, #1 cylinder is discriminated.

Figure 10:
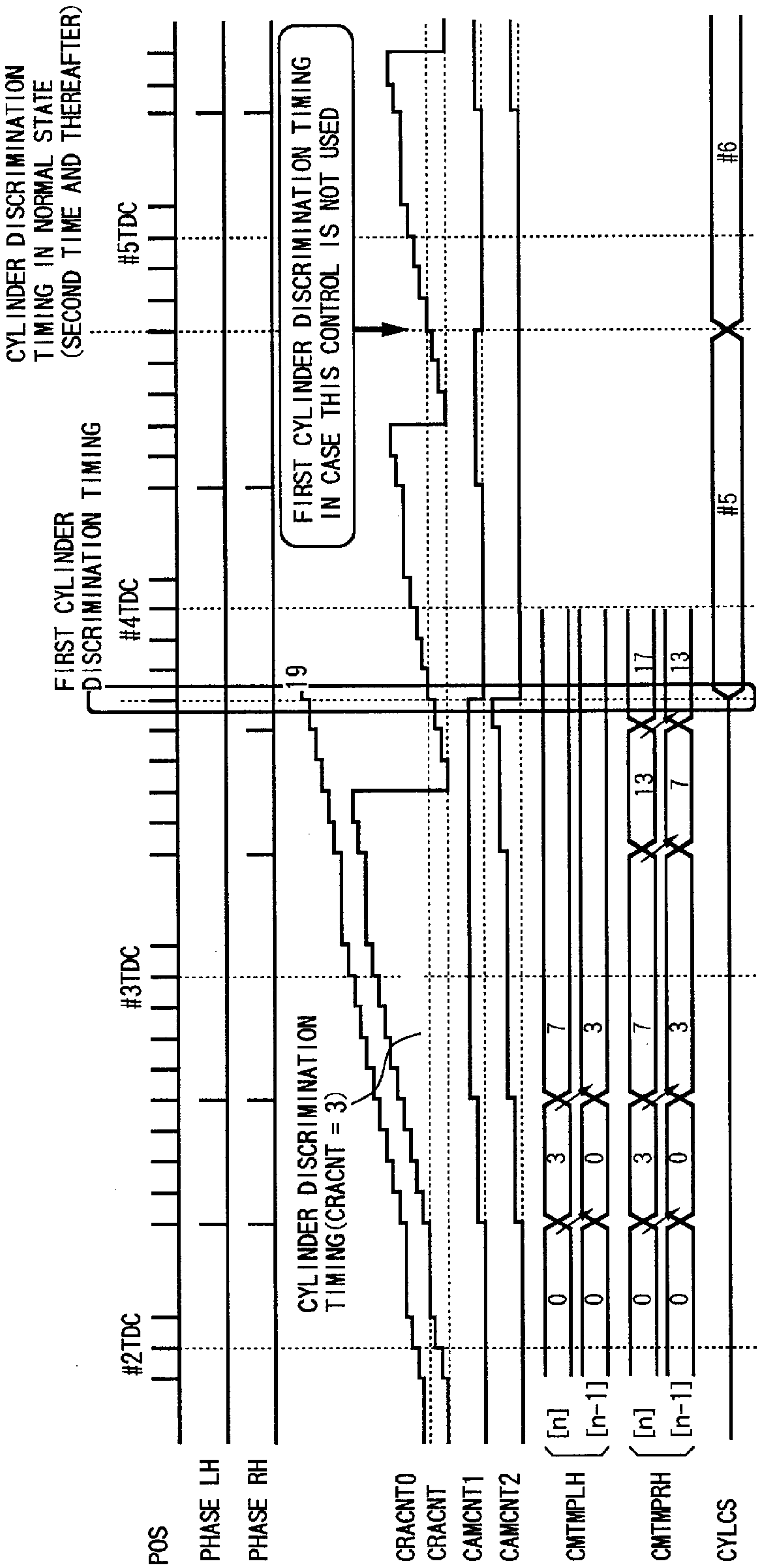
FIG. 10 is a flowchart showing first cylinder discrimination according to the second embodiment.
Figure 11:
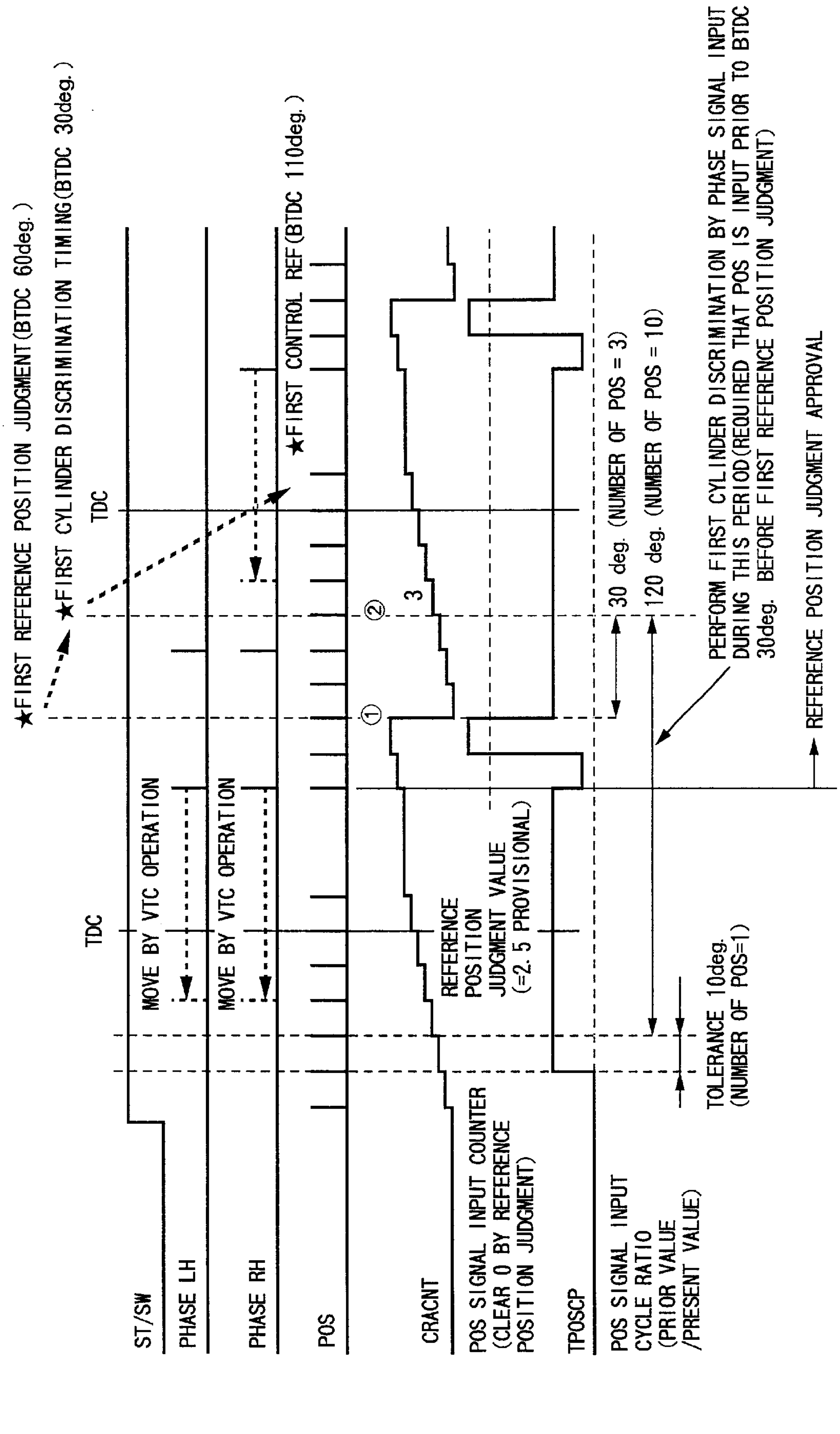
FIG. 11 is a time chart showing a mask processing at the first cylinder discrimination according to the second embodiment.
Figure 12:
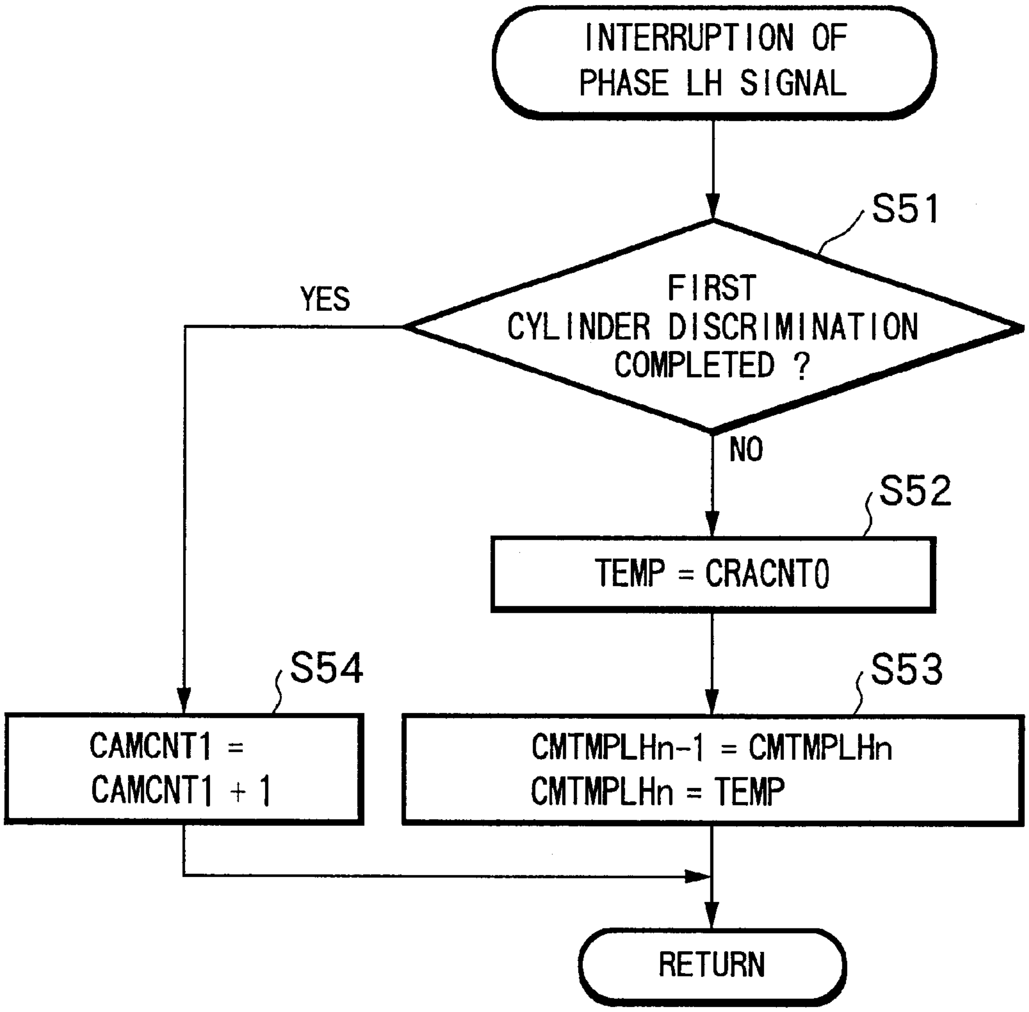
FIG. 12 is a flowchart showing an interruption processing routine of a cylinder discrimination signal on the left bank according to the second embodiment.
Figure 13:
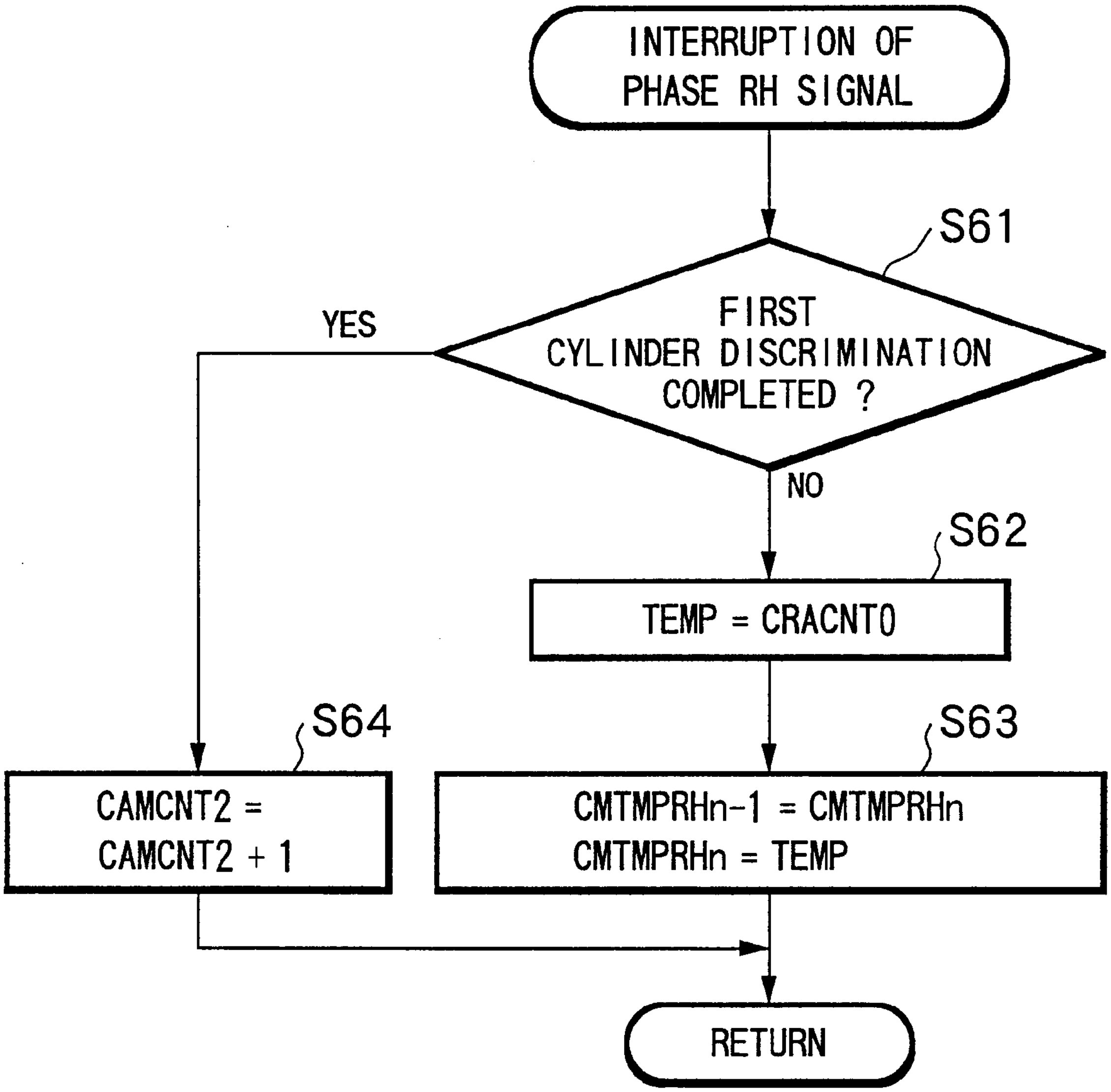
FIG. 13 is a flow chart showing an interruption processing routine of a cylinder discrimination signal on the right bank according to the second embodiment of the present invention.

When the cylinder discrimination of a second time and thereafter is normally performed after a cranking start, the cylinder discrimination is performed by counting the numbers of the output cylinder discrimination signals PhaseLH, PhaseRH by the counters CAMCNT 1, CAMCNT 2 (Step 54 in FIG. 12, Step 64 in FIG. 13, and Step 80 in FIG. 14), first cylinder discrimination according to the present invention is performed in the sama way with the first embodiment. Namely, as shown in FIG. 10, there are provided a left side first sub-counter CMTMPHL(n), which renews and holds a count value of the position signal POS by a main counter CRACNT0, and a left side second sub-counter CMTMPLH (n−1), which renews and holds a prior count value of the left side first sub-counter CMTMPLH(n), each time the cylinder discrimination signal PhaseLH is output (refer to FIG. 12), and also there are provided a right side first sub-counter CMTMPRH(n), which renews and holds a count value of the position signal POS by the main counter CRACNT0, and a right side second sub-counter CMTMPRH(n−1), which renews and holds a prior count value of the right side first sub-counter CMTMPRH(n), each time the cylinder discrimination signal PhaseRH is output (refer to FIG. 13). Then, a mask processing is carried out in the same way as the first embodiment (refer to FIG. 11). Since the engine is a six cylinder engine, a cylinder stroke phase difference is 120°, the number of the position signals output during this period is 10 and the number of the position signals POS output during a period from the reference crank angle position (BTDC 60°) to the cylinder discrimination timing (BTDC 30°) is 3. Therefore, when a tolerance is set as 1, the number (number of masks) of the output position signals POS prohibiting the detection of the reference crank angle position after the cranking start is determined in accordance with the following equation.

Number of masks=10−3+1=8.

Figure 14:
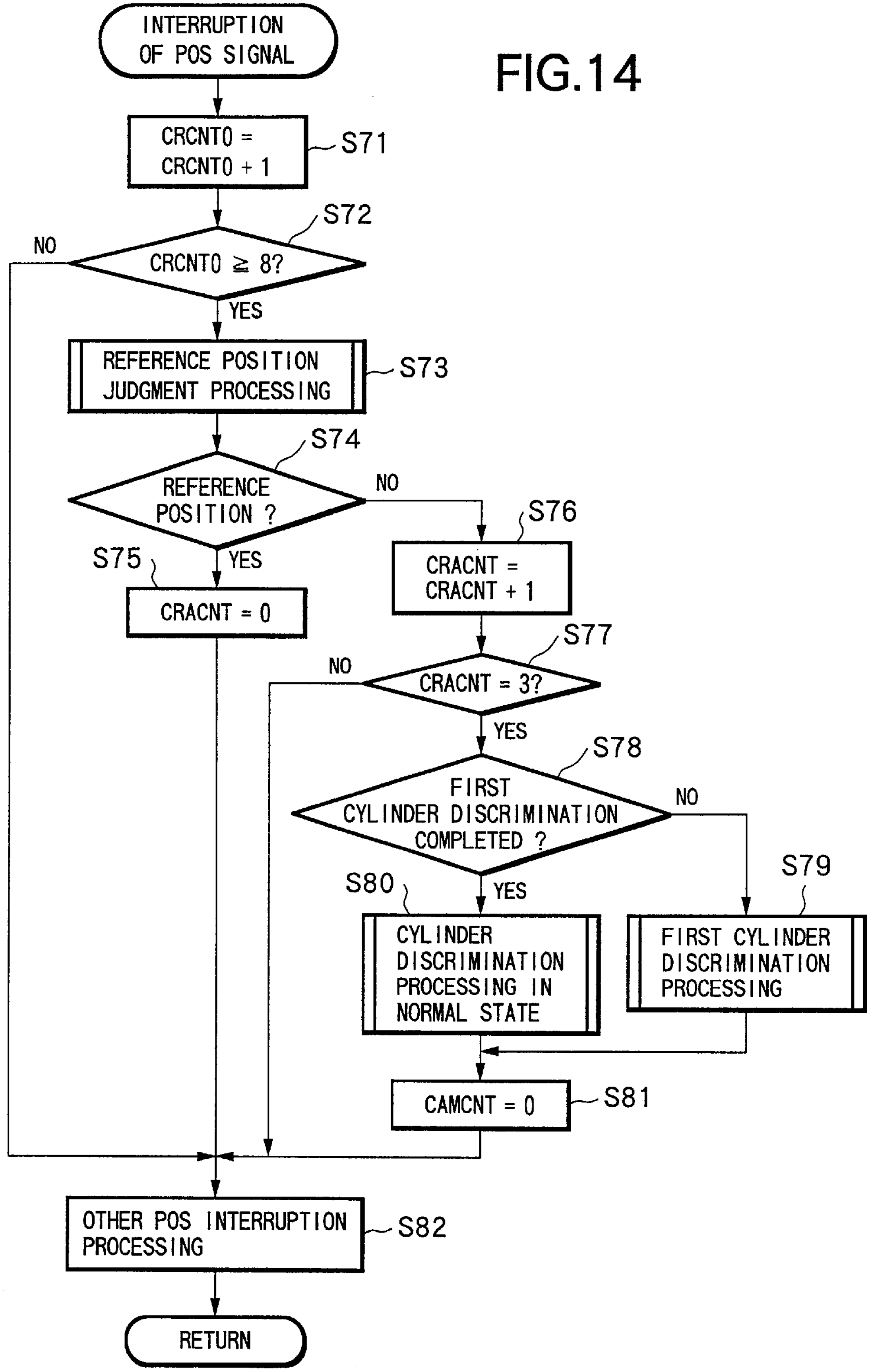
FIG. 14 is a flow chart showing an interruption processing routine of a crank angle signal according to the second embodiment.

Namely, until the count value of the position signals POS by the main counter CRACNT0 after the cranking start reaches 8, the detection of the reference crank angle position by a cycle ratio of the position signals is prohibited judgment at Step 72 in FIG. 14 is NO). After the count value becomes 8 or more, the detection of the reference crank angle position is started judgment at Step 72 in FIG. 14 is YES), and when a predetermined number (3) of the output position signals POS is detected after the detection of the first reference crank angle position, the first cylinder discrimination timing is detected (Step 73, 74→76, 77→78).

Next, first cylinder discrimination at the first cylinder discrimination timing detected in this way will be explained as follows.

Figure 15:
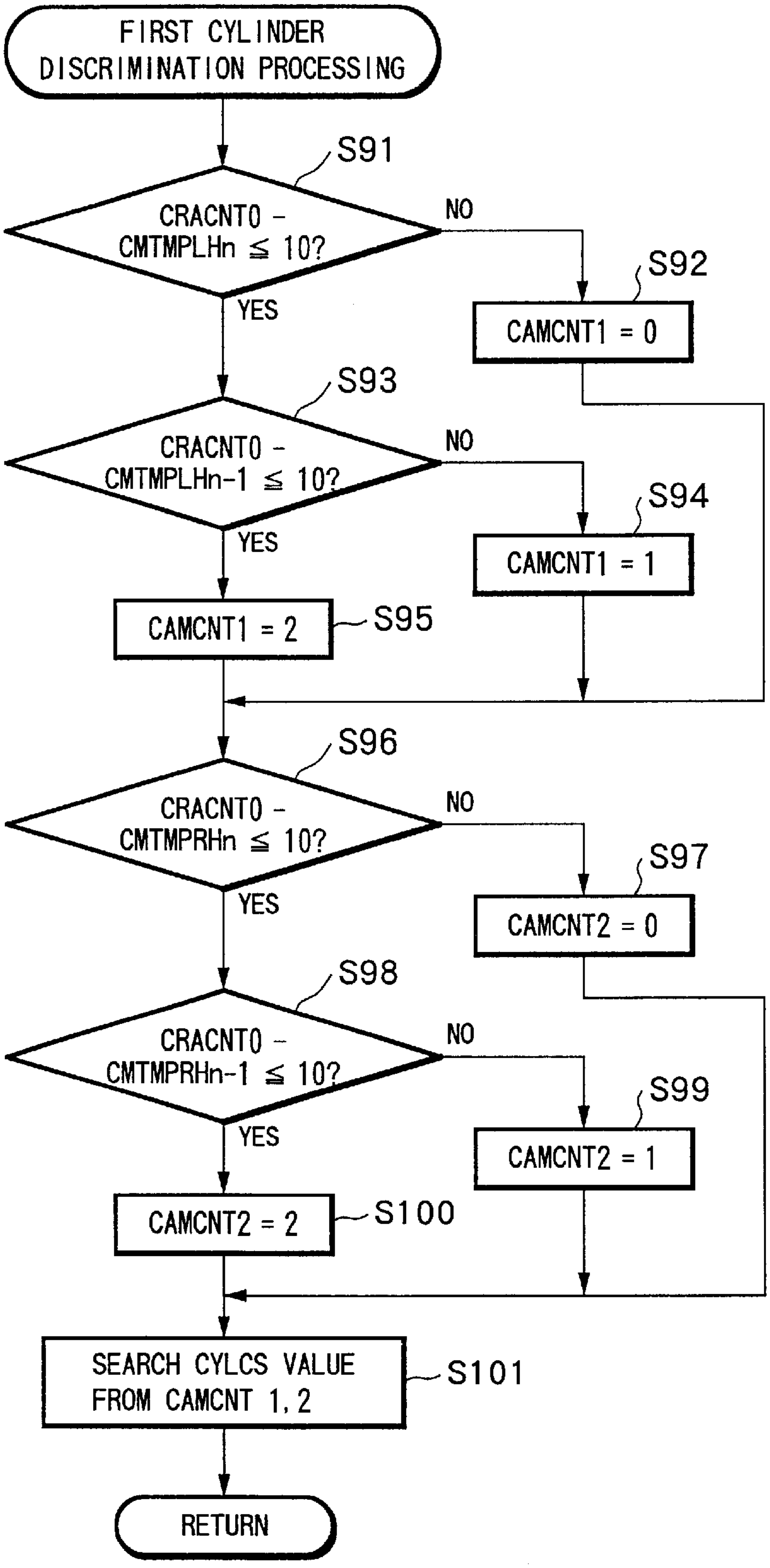
FIG. 15 is a flowchart showing a first cylinder discrimination processing routine according to the second embodiment.

The count values of the left side first sub-counter CMTMPLH(n), the left side second sub-counter CMTMPLH(n−1), the right side first sub-counter CMTMPRH(n), and the right side second sub-counter CMTMPRH(n−1) are subtracted, respectively, from the count value of the main counter CRACNT0, and it is judged whether or not each of these four subtracted values is equal to a predetermined value 10 or less (the number of the position signals output during the crank angle period equivalent to the cylinder stroke phase difference 120°) (Steps 91, 93, 96, 98 in FIG. 15). When the subtracted value is the predetermined value 10 or less, the count value of the corresponding sub-counter CMTMP is renewed by the output of the cylinder discrimination signal Phase during the predetermined crank angle period.

Namely, when the subtracted value of the left side first sub-counter CMTMPLH(n) from the main counter CRACNT0 is 11 or more, the subtracted value of the left side second sub-counter CMTMPLH(n−1) from the main counter CRACNT0 becomes 11 or more. It means that the cylinder discrimination signal PhaseLH has not been output during the predetermined crank angle period, therefore, the count value of the counter CAMCNT1 is set to 0 (Step 92 in FIG. 15). Further, in a case that the subtracted value of the left side first sub-counter CMTMPLH(n) from the main counter CRACNT0 is 10 or less, when the subtracted value of the left side second sub-counter CMTMPLH(n−1) from the main counter CRACNT0 is 11 or more, it means that the cylinder discrimination signal PhaseLH has been output one time, therefore, the count value of the counter CAMCNT1 is set to 1 (Step 94 in FIG. 15), and further, when the subtracted value of the left side second sub-counter CMTMPLH (n−1) from the main counter CRACNT0 is also 10 or less, it means that the cylinder discrimination signal PhaseLH has been output twice, therefore, the count value of the counter CAMCNT1 is set to 2 (Step 95 in FIG. 15).

Likewise, when the subtracted value of the right side first sub-counter CMTMPRH(n) from the main counter CRACNT0 and the subtracted value of the left side second sub-counter CMTMPLH(n−1) from the main counter CRACNT0 are both 11 or more, it is meant that the cylinder discrimination signal PhaseRH has not been output during the predetermined crank angle period. Therefore, the count value of the counter CAMCNT2 is set to 0 (Step 97 in FIG. 15). In a case that the subtracted value of the right side first sub-counter CMTMPRH(n) from the main counter CRACNT0 is 10 or less, when the subtracted value of the right side second sub-counter CMTMPRH(n−1) from the main counter CRACNT0 is 11 or more, the count value of the counter CAMCNT2 is set to 1 (Step 99 in FIG. 15), and further, when the subtracted value of the right side second sub-counter CMTMPRH(n−1) is also 10 or less, the count value of the counter CAMCNT2 is set to 2 (Step 101 in FIG. 15).

Then, the cylinder discrimination is performed based on the combination of the values of the counters CAMCNT1 and CAMCNT2.

In the above-mentioned embodiment, the mask processing to prohibit the reference crank angle position detection is carried out until the predetermined number of the position signals POS are output. However, the constitution may be such that the detection of the reference crank angle position is not prohibited for the time being, and when the count value of the position signals POS at detection of cylinder discrimination timing based on the detected reference crank angle position does not reach the count value of when the crank angle period equivalent to the cylinder stroke phase difference has elapsed, the cylinder discrimination is prohibited.

The entire contents of Japanese Patent Application No. 2000-165669, filed on Jun. 2, 2000, are incorporated herein by reference.

What is claimed:

1. A cylinder discrimination device in an engine, comprising:

a crank angle signal outputting unit for outputting a crank angle signal at a crank angle position for each unit crank angle using a reference crank angle position for each stroke phase difference between cylinders as a reference, in synchronization with the rotation of the crankshaft;

a cylinder discrimination signal outputting unit for outputting different numbers of cylinder discrimination signals, depending on cylinders to be discriminated, during a predetermined crank angle period for each stroke phase difference between cylinders;

a signal counting unit for counting the number of crank angle signals output after a cranking start;

a count value holding unit for holding a count value counted by said signal counting unit of each time said cylinder discrimination signal is output; and a cylinder discrimination unit for comparing the count value of the number of crank angle signal outputs at a first cylinder discrimination timing by said signal counting unit with said past count values held in said count value holding unit, and detecting the number of cylinder discrimination signals output during said predetermined crank angle period, to perform first cylinder discrimination after the cranking start based on the number of said cylinder discrimination signals.

2. A cylinder discrimination device in an engine according to claim 1, wherein said signal count holding unit holds, as the past count values, a plurality of count values including the latest renewed value and the values prior to the latest renewed value, and said cylinder discrimination unit detects, based on a value obtained by subtracting each past count value from the count value at the first cylinder discrimination timing, the number of the cylinder discrimination signals output during said predetermined crank angle period.

3. A cylinder discrimination device in an engine according to claim 1, wherein a detection of said reference crank angle position is prohibited until a predetermined number of the crank angle signals after the cranking start is output.

4. A cylinder discrimination device in an engine according to claim 1, wherein if the count value of the crank angle signals when detected a cylinder discrimination timing after the cranking start does not reach the count value of when said predetermined crank angle period has elapsed, the cylinder discrimination at said cylinder discrimination timing is prohibited.

5. A cylinder discrimination device in an engine according to claim 1, wherein said engine is provided with a valve timing control device for detecting a rotation phase of a camshaft relative to said crankshaft to variably control said rotation phase successively, said crank angle signal outputting unit outputs a crank angle signal in synchronization with the rotation of said crankshaft, and said cylinder discrimination signal outputting unit outputs a cylinder discrimination signal in synchronization with the rotation of said camshaft.

6. A cylinder discrimination device in an engine according to claim 1, wherein said cylinder discrimination unit performs cylinder discrimination of second time and thereafter after the cranking start by directly detecting the number of the cylinder discrimination signals output during said each cylinder discrimination timing.

7. A cylinder discrimination device in an engine according to claim 1, wherein said engine is a V-type engine, said cylinder discrimination signal outputting unit outputs a cylinder discrimination signal in synchronization with a camshaft on each bank of said V-type engine, and said cylinder discrimination unit performs cylinder discrimination by combination of the number of the cylinder discrimination signals for said each bank.

8. A cylinder discrimination method in an engine, comprising the steps of:

outputting a crank angle signal at a crank angle position for each unit crank angle using a reference crank angle position for each stroke phase difference between cylinders as a reference, in synchronization with the rotation of the crankshaft, and outputting different numbers of cylinder discrimination signals, depending on cylinders to be discriminated, during a predetermined crank angle period for each stroke phase difference between cylinders;

counting the number of crank angle signals output after a cranking start, and holding a count value of each time said cylinder discrimination signal is output;

comparing the count value of the number of crank angle signal outputs at a first cylinder discrimination timing with said past count values held, to detect the number of cylinder discrimination signals output during said predetermined crank angle period; and performing first cylinder discrimination after the cranking start based on the number of said detected cylinder discrimination signals.

9. A cylinder discrimination method in an engine according to claim 8, wherein as said past count values, a plurality of count values including the latest renewed value and the values prior to the latest renewed value are held, and, based on a value obtained by subtracting each past count value from the count value at the first cylinder discrimination timing, the number of the cylinder discrimination signals output during said predetermined crank angle period is detected.

10. A cylinder discrimination method in an engine according to claim 8, wherein a detection of said reference crank angle position is prohibited until a predetermined number of the crank angle signals after the cranking start is output.

11. A cylinder discrimination method in an engine according to claim 8, wherein if the count value of the crank angle signals when detected a cylinder discrimination timing after the cranking start does not reach the count value of when said predetermined crank angle period has elapsed, the cylinder discrimination at said cylinder discrimination timing is prohibited.

12. A cylinder discrimination method in an engine according to claim 8, wherein said engine is provided with a valve timing control device for detecting a rotation phase of a camshaft relative to said crankshaft to variably control said rotation phase successively, said crank angle signal is output in synchronization with the rotation of said crankshaft, and said cylinder discrimination signal is output in synchronization with the rotation of said camshaft.

13. A cylinder discrimination method in an engine according to claim 8, wherein cylinder discrimination of second time and thereafter after the cranking start is performed by directly detecting the number of the cylinder discrimination signals output during said each cylinder discrimination timing.

14. A cylinder discrimination method in an engine according to claim 8, wherein in a V-type engine, said cylinder discrimination signal is output in synchronization with a camshaft on each bank of said V-type engine, and cylinder discrimination is performed by combination of the number of the cylinder discrimination signals for said each bank.

* * * * *